United States Patent [19]

Andres et al.

[11] Patent Number: 4,586,528

[45] Date of Patent: May 6, 1986

[54] AIR RELEASE VALVE

[75] Inventors: Lewis B. Andres, Bloomingdale; Robert L. Esvang, Schaumburg; Ralph N. Di Lorenzo, Rolling Meadows, all of Ill.

[73] Assignee: APCO Valve and Primer Corporation, Schaumburg, Ill.

[21] Appl. No.: 708,481

[22] Filed: Mar. 5, 1985

[51] Int. Cl.⁴ ............................................. F16K 33/00
[52] U.S. Cl. ..................................... 137/202; 137/433
[58] Field of Search ................. 137/202, 433; 73/322.5

[56] References Cited

U.S. PATENT DOCUMENTS 659,819  10/1900  Lockwood .......................... 73/322.5
726,317  4/1902  Lockwood .......................... 73/322.5
2,243,262  5/1941  Smith ................................... 137/202
3,768,498  10/1973  Urban ................................... 137/202

Primary Examiner—Alan Cohan
Attorney, Agent, or Firm—Cushman, Darby & Cushman

[57] ABSTRACT

A float-operated air release valve for a liquid transport system includes an internal float which has a downwardly concave impact surface arranged to be struck by any liquid entering the valve chamber thereby reducing the response time of the valve and rapidly closing the valve outlet before liquid can be discharged from the outlet. The impact force on the float can be enhanced by providing a depending flange around a substantial portion of the periphery of the concave surface.

7 Claims, 3 Drawing Figures

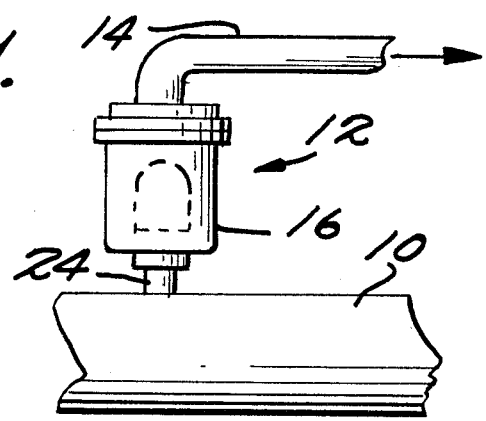
Fig. 1.
Fig. 3.
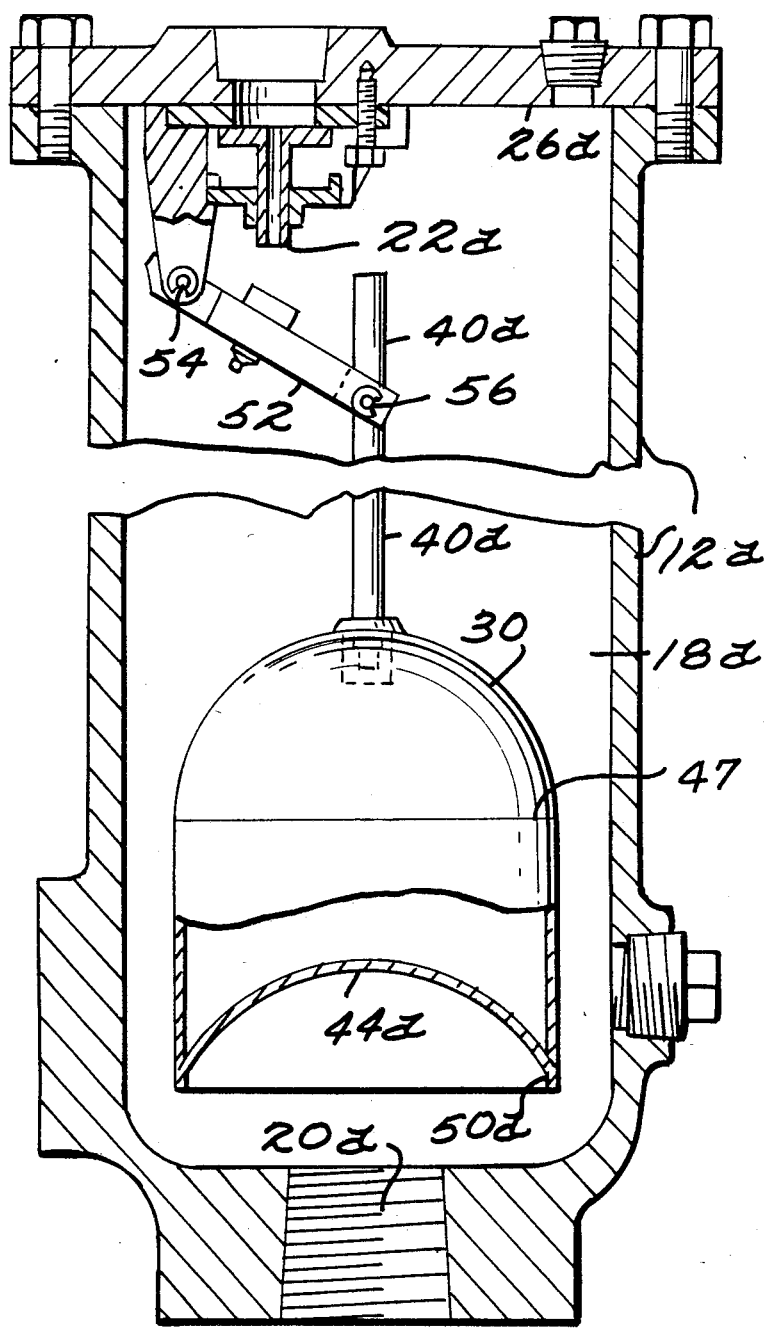

AIR RELEASE VALVE

This invention relates to improvements in float-operated air release valves, which term is used to mean valve assemblies which release air from a liquid transport system through a vent and which close automatically when liquid from the system tends to pass outwardly through the vent.

BACKGROUND AND SUMMARY OF THE INVENTION

Air discharge valves of the kind defined above are typically used in water or sewage transport systems to permit air to be vented from pipelines or holding vessels to atmosphere during normal operation of the systems but to prevent spillage of liquid from the systems in the event of pressure surges in the liquid in the system or other system malfunction resulting in liquid being forced from the system into the valve. The air normally passes from the system into the valve assembly and then out of the valve assembly through one or more vents or discharge openings. A movable closure member forming part of the assembly is actuated by any system liquid which tends to pass out through the discharge opening. Basically, such a valve assembly includes a casing or housing which is in communication via an inlet at its lower end with the pipeline or vessel and in communication with the atmosphere at a location above the inlet via the air discharge opening. The movable closure member for the discharge opening is located in the casing and is connected to or part of a hollow, sealed float, also located in the casing. In the event that liquid enters and rises in the casing from the liquid transport system the float becomes buoyant and rises with the rising liquid. The closure member is moved by the float into engagement with the discharge opening and thereby prevents spillage of liquid through the air discharge opening.

The object of the present invention is to provide a float-operated air release valve which has decreased response time to potential liquid spillage from the valve, without increasing the size or complexity of the valve. A decrease in response time is particularly desirable in raw sewage systems in order to ensure that raw sewage is not permitted to be discharged. This object is achieved by means of an improved float having a downwardly facing impact surface located so as to be immediately impacted by liquid rising in the casing. The impacting force of the liquid on the impact surface of the float causes the float to begin moving upwardly before buoyancy alone would be effective to cause movement and thus the air discharge opening becomes closed very quickly. It has been found that by providing an impact surface in the form of a downwardly facing concave surface of a substantial area relative to the cross sectional area of the float, upward movement of the float and hence closing of the discharge opening is significantly more rapid than with conventional floats which have lower ends which are downwardly convex, usually hemispherical in shape. More specifically, it has been found that a concave impact surface is more effective in reducing the response time of the valve assembly than is a flat surface which is perpendicular to the direction of liquid movement. The degree of concavity should be 50%–200%, preferably 70%–100%, according to the formula $(D_c/D_f) \times 100 =$ percent concavity, where $D_c$ is the diameter of curvature of the concave surface and $D_f$ is the diameter of the float.

In the preferred construction the concave surface of the float bottom occupies 75% or more of the transverse cross sectional area of the float. In functional terms the concavity should be such that it provides an impact area sufficient to produce a response time significantly less than the response time of a flat float bottom.

It has also been found that providing a downwardly projecting flange extending around all or a substantial portion of the concave impact surface is significant for effecting reduced response time. The ratio of flange length to float diameter should be at least about 1:20 and may be up to about 1:5, e.g. for a float of 5 inch diameter the flange should be ¼ inch to one inch in length.

BRIEF DESCRIPTION OF THE DRAWINGS

FIG. 1 is schematic view of a sewage pipe line which includes an air release valve embodying the principles of the present invention;

FIG. 3 is vertical sectional view of a second embodiment of air release valve.

DETAILED DESCRIPTION

Figure 2:
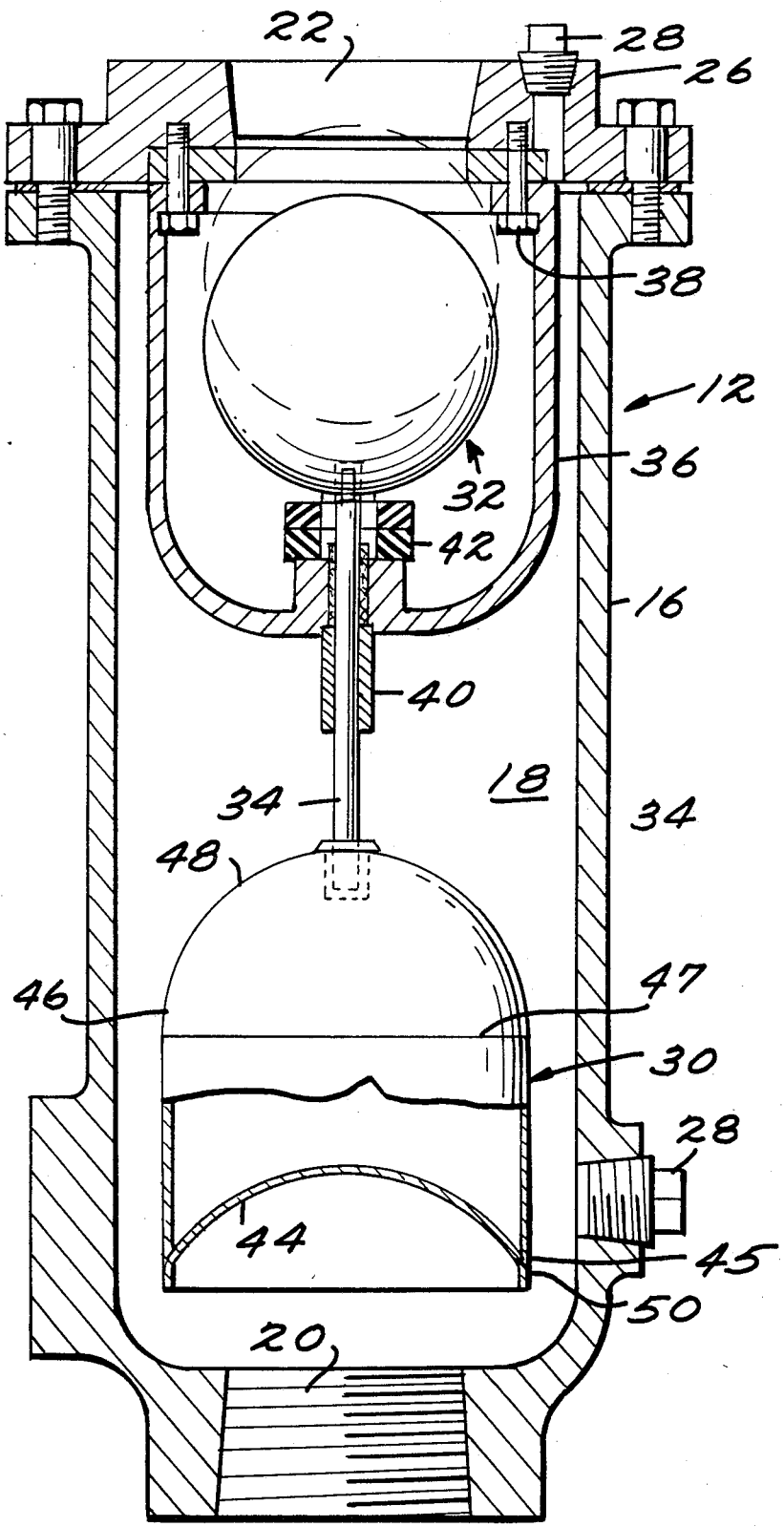
FIG. 2 is a detailed vertical sectional view of the air release valve of FIG. 1.

FIG. 1 schematically illustrates a portion of a pipeline 10 for transporting sewage. At various locations along the length of the pipeline an air release valve 12 is connected to the upper side of the pipeline for the purpose of venting air through a vent line 14 to atmosphere.

Details of the air release valve 12 are shown in FIG. 2. The valve includes a housing 16 defining an internal vertical cylindrical chamber 18 which is in communication with an inlet opening 20 and a discharge opening 22. The inlet opening 20 is located in the bottom wall of the housing coaxially with the axis of the cavity 18 and is internally threaded to receive a threaded pipe stub 24 (FIG. 1) which is connected to the pipeline 10. The discharge opening 22 is located well above the level of the inlet opening 20 and is internally threaded for connection to the vent line 14. In the illustrated embodiment the discharge opening 22 is provided in a cap 26 of the housing 16 and is coaxial with the chamber 18. The exact location and orientation of the discharge opening is not critical, however.

The housing 16 is also provided with one or more apertures for cleaning purposes, these apertures being normally closed with pipe plugs 28.

Within the chamber 18 is a hollow, sealed float 30 which is buoyant in the sewage liquid in the pipeline 10, the float 30 being of lesser transverse dimension than the chamber 18 so that any liquid entering through the inlet opening 20 can surround the float and cause it to rise as the liquid rises in the chamber 18. A valve closure member 32, in the form of a ball coaxial with discharge opening 22 in the illustrated embodiment, is connected to the float 30 by a vertical stem 34. The closure member 32 resides within a vertically slotted cup-shaped baffle 36 which is connected to the lower surface of the cap 26 by bolts 38, the stem 34 passing through a guide 40 in the bottom of the baffle 36. In the normal position of the float 30, as shown in full line in FIG. 2, the lower surface of the closure member 32 rests on a bumper 42 within the baffle 36 in spaced relation to the discharge opening 22. In this position of the closure member 22, the float 30 is held in a position such that its lower end resides above the inlet opening 20 so that air entering through the latter passes upwardly around the float 30, through the slots in the baffle 36 and out through the discharge opening 22.

According to the principles of the present invention, the lower end of the float is concave downwardly and is arranged directly above the inlet opening 20 to thereby present a concave impact surface 44 to any liquid which might pass upwardly through the inlet opening 20. The shape of the float 30 other than the concavity 44 in its lower end is not particularly significant, although in general it will be circular in transverse cross section. In the illustrated embodiment, the float has a cylindrical side wall 46 and a semispherical upper end 48.

In the illustrated embodiment, the concave impact surface 44 is a sector of a sphere and occupies 100% of the transverse cross section of the float 30, and the diameter of the curvature of the surface 44 is greater than the diameter of the cylindrical portion of the float. These relationships can, however, lie within the ranges previously specified.

Also, according to the present invention, the effect of the concave impact surface 44 is enhanced by providing a depending flange 50 around all or a substantial portion of the periphery of the concave surface 44.

The float 30, as illustrated, is constructed of three pieces connected together. The semispherical top piece 48 is welded or brazed to the upper end of the cylindrical side wall 46 at 47. The bottom piece is pre-shaped to provide the concave surface 44 and the flange 50 and is welded or brazed at 45 to the lower end of the side wall 46.

As stated above, in normal operation of the valve 12 the float 30 and closure member 32 are as shown in FIG. 2, so that air from the pipeline 10 can pass through the valve chamber 18 and out through the discharge opening 22. In the event that sewage passes from the pipeline 10 through the valve inlet opening 20 into the valve chamber 18 the sewage immediately strikes the concave impact surface 44 of the float 30 thereby creating an upward force on the surface 44, this force being enhanced by the circular depending flange 50 which tends to reduce lateral movement of the sewage as it strikes the surface 44. This force may be sufficient to actually start moving the float 30 upwardly or it may be only sufficient to in effect increase the buoyancy of the float 30 as the sewage rises around the float. In either case the result is that the float 30 moves upwardly more quickly than it would were the concavity 44 not present. The presence of the concavity 44, as compared to a flat or convex surface, thus reduces the response time of the valve 12, in the sense that the closure member 32 engages and closes the discharge opening 22 (the dotted line position shown in FIG. 2) in a significantly shorter time period.

FIG. 3 illustrates an embodiment which is essentially the same as the FIG. 2 embodiment except for the connection between the float and the valve closure member. In FIG. 3 the discharge outlet 22a is offset from the axis of the valve chamber 18a, and the valve closure member is a flap 52 assembly pivoted at one side at 54 to the valve cap 26a and at its opposite side at 56 to the stem 40a. The operation of the FIG. 3 valve is the same as the operation of the FIG. 2 valve.

What is claimed is:

1. In a fast-operating air release valve operable to be normally open to release air from a liquid transport system and to close automatically to prevent spillage of liquid when pressure surges in the liquid in the system or other system malfunction tend to force liquid to flow through said valve, said valve being of the kind including a housing having a bottom wall provided with an inlet opening adapted to be connected to said system, said housing also having a discharge opening above the level of said inlet opening, a float buoyant with respect to liquid of the system arranged in the casing such that liquid entering the casing through said inlet and rising in the casing surrounds said float and causes the same to rise; and movable closure means operatively associated with said float and with said discharge opening such that rising of said float moves said closure means into closing relationship with said discharge opening, the improved float construction wherein said float has a bottom wall located above said inlet opening, said bottom wall when viewed in vertical section having a continuously curved downwardly facing concave impact surface of such concavity and area that liquid entering through said inlet opening and striking said concave impact surface causes said float to move upwardly to close said discharge opening in a shorter time period than occurs by float buoyancy alone.

2. An air release valve as in claim 1 wherein said float includes a vertical flange extending substantially around the periphery of said continuously curved concave impact area.

3. An air release valve as in claim 2 wherein the ratio of flange length to float diameter is in the range about 1:20 to about 1:5.

4. An air release valve as in claim 1 wherein said concave impact surface is generally spherical and has a diameter of curvature greater than the transverse dimension of the float by a factor of up to 2.

5. An air release valve as in claim 1 wherein said concave impact surface occupies at least 75% of the cross sectional area of said float.

6. An air release valve for releasing only air from a liquid transport system comprising: a housing having a vertical cylindrical internal cavity, said housing having a lower end provided with a vertically facing inlet opening located on the axis of said cavity and adapted to be connected to a liquid transport system and said housing also having a discharge opening above the location of said inlet opening; a hollow sealed float of circular transverse cross section disposed in said cavity coaxial with said inlet opening, said float having a concave bottom surface which is generally spherical and which has a diameter of curvature greater than the diameter of the float and up to about twice as great and a depending vertical peripheral flange substantially surrounding said concave surface, the ratio of flange length to float diameter being in the range about 1:20 to about 1:5; and a movable discharge-opening closure member operatively associated with said float for closing said discharge opening upon upward movement of said float.

7. A float for a float-operated air release valve of the kind having a valve closure member which closes an air discharge opening upon upward movement of the float caused by liquid entering the valve, said float comprising a hollow sealed body of circular transverse cross section, said float having a concave bottom surface and a vertical depending peripheral flange substantially surrounding said concave surface, said concave surface being generally spherical and having a diameter of curvature greater than the diameter of the body and up to about twice as great and the ratio of flange length to body diameter being in the range about 1:20 to about 1:5.

* * * * *